(12) United States Patent
Curtis et al.

(10) Patent No.: US 7,993,522 B2
(45) Date of Patent: Aug. 9, 2011

(54) CONDITIONING SYSTEM FOR ACTIVATED SLUDGE WASTEWATER TREATMENT PROCESSES

(75) Inventors: Betty-Ann Curtis, Waukesha, WI (US); Thomas Kutcher, Milford, OH (US); Marc E. Roehl, Mukwonago, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 452 days.

(21) Appl. No.: 12/161,846

(22) PCT Filed: Jan. 24, 2007

(86) PCT No.: PCT/US2007/001815
§ 371 (c)(1),
(2), (4) Date: Nov. 18, 2008

(87) PCT Pub. No.: WO2007/089481
PCT Pub. Date: Aug. 9, 2007

(65) Prior Publication Data
US 2009/0078646 A1 Mar. 26, 2009

Related U.S. Application Data

(60) Provisional application No. 60/700,166, filed on Jul. 18, 2005, provisional application No. 60/761,845, filed on Jan. 25, 2006.

(30) Foreign Application Priority Data

Jul. 18, 2006 (WO) ................ PCT/US2007/001815

(51) Int. Cl.
*C02F 3/00* (2006.01)
(52) U.S. Cl. ........ 210/605; 210/607; 210/620; 210/621; 210/622; 210/623; 210/624; 210/625; 210/626

(58) Field of Classification Search .................. 210/605, 210/607, 620–626
See application file for complete search history.

(56) References Cited

U.S. PATENT DOCUMENTS

| | | | |
|---|---|---|---|
| 3,047,492 A | 7/1962 | Gambrel | 210/7 |
| 3,756,946 A | 9/1973 | Levin et al. | 210/6 |
| 4,159,944 A | 7/1979 | Erickson et al. | 210/6 |
| 4,279,753 A | 7/1981 | Nielson et al. | 210/605 |
| 4,407,717 A | 10/1983 | Teletzke et al. | 210/616 |
| 4,790,939 A | 12/1988 | Suzuki et al. | 210/608 |

(Continued)

OTHER PUBLICATIONS

Dong Hyun Chon, "Performance and Mechanisms of Excess Sludge Reduction in the Cannibal(TM) Process," Mar. 30, 2005, M.S. Thesis, Virginia Polytechnic Univ., Blacksburg, VA.*

(Continued)

*Primary Examiner* — Chester T Barry (57) ABSTRACT

Wastewaters are treated by an activated sludge process that includes combining wastewater with bacteria-laden sludge in an activated sludge tank to form a mixed liquor, separating the mixed liquor into a clear effluent and activated sludge stream, pretreating at least a portion of the activated sludge stream in a conditioning tank, transferring at least a portion of the activated sludge stream in the conditioning tank to an interchange bioreactor operating in batch or continuous flow mode, processing the activated sludge stream within the interchange bioreactor by selecting desired growth conditions to cultivate at least one type of bacteria in the activated sludge stream, and returning at least a portion of the activated sludge stream in the bioreactor to the activated sludge tank. The process may further include a sidestream reactor to remove phosphates from the activated sludge stream leaving the interchange bioreactor.

60 Claims, 5 Drawing Sheets

U.S. PATENT DOCUMENTS

| | | | |
|---|---|---|---|
| 4,999,111 A | 3/1991 | Williamson | 210/605 |
| 5,013,442 A | 5/1991 | Davis et al. | 210/614 |
| 5,094,752 A | 3/1992 | Davis et al. | 210/614 |
| 5,128,040 A | 7/1992 | Molof et al. | 210/605 |
| 5,246,585 A | 9/1993 | Meiring | 210/605 |
| 5,288,405 A | 2/1994 | Lamb, III | 210/605 |
| 5,356,537 A | 10/1994 | Thurmond et al. | 210/607 |
| 5,733,455 A | 3/1998 | Molof et al. | 210/605 |
| 5,853,588 A | 12/1998 | Molof et al. | 210/605 |
| 6,015,496 A | 1/2000 | Khudenko | 210/603 |
| 6,113,788 A | 9/2000 | Molof et al. | 210/605 |
| 6,383,387 B2 | 5/2002 | Hasegawa et al. | 210/609 |
| 6,585,895 B2 | 7/2003 | Smith et al. | 210/606 |
| 7,163,629 B2 | 1/2007 | Abu-Orf et al. | 210/603 |
| 7,520,980 B2 * | 4/2009 | Monosov et al. | 210/150 |

OTHER PUBLICATIONS

Ruth Roxburgh, et al., "Sludge Minimization Technologies—Doing More to Get Less," WEFTEC(R) 06, 2006, p. 506-525.*
International Search Report dated Jul. 2, 2008 for Application No. PCT/US07/01815.

* cited by examiner

CONDITIONING SYSTEM FOR ACTIVATED SLUDGE WASTEWATER TREATMENT PROCESSES

CROSS-REFERENCE TO RELATED APPLICATIONS

This application claims priority to International Patent Application No. PCT/US2006/27736, filed on Jul. 18, 2006, which claims priority to U.S. Provisional Patent Application No. 60/700,166, filed on Jul. 18, 2005. The entire content of these applications are incorporated herein by reference.

This application further claims priority to U.S. Provisional Patent Application No. 60/761,845, filed on Jan. 25, 2006, the entire content of which is incorporated herein by reference.

FIELD OF THE INVENTION

The present invention relates to the treatment of wastewaters from municipal, commercial and industrial sources. More particularly, the invention relates to activated sludge wastewater treatment processes.

BACKGROUND OF THE INVENTION

Many wastewater treatment plants employ an activated sludge process to break down the organic matter in wastewater. A conventional activated sludge process typically begins with the removal of course materials such as grit, large particulate matter and other suspended solids from the wastewater. The wastewater is then sent to a primary clarifier to separate sludge from a clear supernatant. The sludge is removed for disposal or further treated in a digester, where a clear liquid is recycled back to the primary clarifier and the unconsumed sludge is sent off for disposal. The clear supernatant from the primary clarifier is combined in an aeration tank with bacteria-laden sludge, also referred to as activated sludge, from a downstream process. The clear supernatant and activated sludge form a mixed liquor that is aerated in the aeration tank to reduce the BOD. The mixed liquor is then sent to a secondary clarifier or membrane system to settle and/or thicken the sludge and leave a clear effluent. The clear effluent is removed, disinfected and typically discharged into a local waterway. A portion of the sludge is returned to the aeration tank as return activated sludge (RAS), while the remainder is usually concentrated and sent off for disposal as waste activated sludge (WAS).

Current wastewater treatment processes exhibit two important drawbacks. First, many wastewater treatment processes generate large amounts of WAS that must be sent off-site for disposal. Handling and disposal of WAS is typically the largest single cost component in the operation of a wastewater treatment plant. Second, most wastewater treatment processes cannot effectively respond to diurnal, seasonal, or long-term variations in the composition of wastewater. A treatment process that may be effective in treating wastewater during one time of the year may not be as effective at treating wastewater during another time of the year. Therefore, a need exists within the industry for a wastewater treatment process that both lowers WAS and adjusts effectively to fluctuations in wastewater composition.

SUMMARY

In one embodiment, the invention provides a method for treating wastewater comprising combining wastewater with bacteria-laden sludge in an activated sludge tank to form a mixed liquor, separating the mixed liquor into a clear effluent and activated sludge stream, processing at least a portion of the activated sludge stream in an interchange bioreactor by selecting desired growth conditions to cultivate at least one type of bacteria, wherein the interchange bioreactor comprises at least two compartments, and returning at least a portion of the activated sludge stream in the bioreactor to the activated sludge tank.

In another embodiment, the invention provides a method for treating wastewater comprising combining wastewater with bacteria-laden sludge in an activated sludge tank to form a mixed liquor, separating the mixed liquor into a clear effluent and activated sludge stream, pretreating at least a portion of the activated sludge stream in a conditioning tank comprising at least two conditioning zones, transferring at least a portion of the pretreated activated sludge stream in the conditioning tank to an interchange bioreactor, processing the pretreated activated sludge stream within the interchange bioreactor by selecting desired growth conditions to cultivate at least one type of bacteria in the pretreated activated sludge, and returning at least a portion of the activated sludge stream in the interchange bioreactor to the activated sludge tank.

In a further embodiment, the invention provides a method of treating wastewater, the method comprising the steps of conducting wastewater to an activated sludge tank for treatment comprising contact with a first biological population having a first-biological population profile to produce a mixed liquor including activated sludge, separating the activated sludge from the mixed liquor to produce an activated sludge stream, drawing off a first portion of the separated activated sludge stream and returning said first portion to the activated sludge tank, drawing off a second portion of the separated activated sludge stream and adding that second portion to at least one off-line treatment area operating in continuous flow mode, controlling the off-line treatment area so as to produce, in the off-line treatment area, a second biological population having a second-biological population profile different from the first-biological population profile, and returning at least a fraction of the produced second biological population to the activated sludge tank, wherein the second biological population achieves lower solids levels.

In yet a further embodiment, the invention provides a method for treating wastewater in a wastewater treatment system including an activated sludge tank for receiving wastewater and for treatment including contact with a first biological population having a first-biological population profile, the method comprising the steps of drawing off a portion of the first biological population and adding said drawn-off portion to an off-line treatment area operating in continuous flow mode, controlling the off-line treatment area to produce a second biological population having a second-biological population profile different from the first-biological population profile, such controlling including sequentially subjecting the off-line treatment area portion to one of aerobic conditions, anoxic conditions and anaerobic conditions followed by subjecting the off-line treatment area portion to at least one of aerobic conditions, anoxic conditions and anaerobic conditions, and returning at least a portion of the second biological population to the activated sludge tank.

In another embodiment, the invention provides a method of treating wastewater, the method comprising the steps of combining wastewater and a first biological population having a first-biological population profile in an activated sludge tank, exposing the wastewater and first biological population in the activated sludge tank to at least one of an anaerobic, anoxic and aerobic conditions to form a mixture including sludge, separating the sludge from the mixture, drawing off a first portion of the separated sludge and returning said first portion to the activated sludge tank, drawing off a second portion of the separated sludge to an off-line treatment area operating in continuous flow mode, controlling the off-line treatment area so as to produce, in the off-line treatment area, a second biological population having a second-biological population profile different from the first-biological population profile, such that the second-biological population profile is customized to minimize the disposal volume of residual solids produced by the treatment of the wastewater, and returning at least a fraction of the produced second biological population to the treatment area.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The word "conduit" is used broadly to represent a pathway, and is not meant to be restricted to any particular physical or mechanical device.

DETAILED DESCRIPTION

Figure 1:
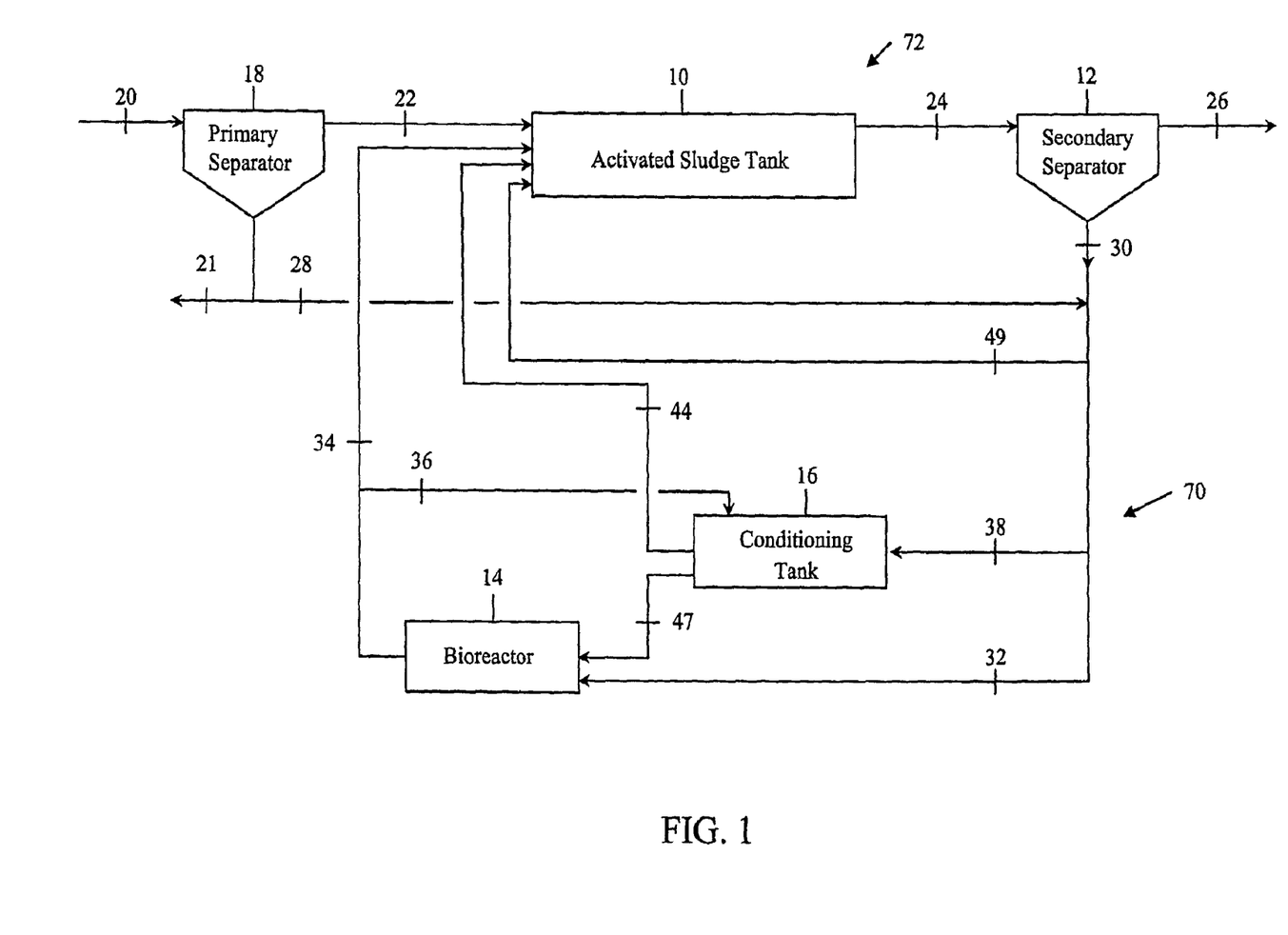
FIG. 1 is a schematic view of an improved wastewater treatment system embodying the invention.

FIG. 1 illustrates a schematic view of an improved wastewater treatment system embodying the invention. The wastewater treatment system minimizes WAS by employing an activated sludge tank 10 in combination with a secondary separator 12 and an interchange bioreactor 14. A conditioning tank 16 is added upstream of the interchange bioreactor 14 and adds operational flexibility to the treatment process by providing a controlled system for conditioning the wastewater before it is sent to the interchange bioreactor 14 and/or activated sludge tank 10.

As shown in FIG. 1, untreated wastewater comprising, for example, BOD, nitrogen and phosphorus may be pretreated in a primary separator 18. Wastewater is transported by conduit 20 to the primary separator 18 where solids, such as grit and large particulate matter, are separated from a primary effluent. The solids may be removed from the system by conduit 21 and/or added to the activated sludge downstream of a secondary separator 12 by conduit 28. The primary effluent, or untreated wastewater if no pretreatment is used, is transported by conduit 22 to the activated sludge tank 10 where it is mixed with a bacterial-laden sludge, or an activated sludge, to form a mixed liquor.

The activated sludge tank 10 subjects the mixed liquor to one or more biological growth conditions that cultivate microorganisms to reduce BOD and ammonia originating from the wastewater. The activated sludge tank 10 typically comprises one or more reactor zones, each of which operates under anaerobic, anoxic or aerobic conditions. An anaerobic zone cultivates anaerobic microorganisms that thrive in an oxygen-free environment. An anoxic zone supplies oxygen or nitrate to the mixed liquor at a rate insufficient to create a measurable dissolved oxygen level, thus resulting in an oxygen deficit. An aeration zone cultivates aerobic microorganisms that thrive under a continuous oxygen surplus. Although the invention should in no way be limited, it is believed that in the anaerobic zone microorganisms take up and store simple carbon compounds, using energy derived from the hydrolysis and release of phosphates. Anoxic zone microorganisms typically use oxygen to oxidize BOD and/or ammonia. When the oxygen supply is less than the demand, anoxic microorganisms can use the nitrates generated from the oxidation of ammonia to further oxidize BOD and generate nitrogen gas. Aerobic zone microorganisms oxidize BOD and simultaneously absorb and store phosphates. Aerobic zone microorganisms also oxidize ammonia.

The activated sludge tank 10 may be specifically tailored to reduce BOD and ammonia in wastewater by varying the number and sequence of reactor zones. The activated sludge tank 10 may be divided into a finite number of discrete zones defined by distinct boundaries. In one embodiment, the activated sludge tank 10 comprises three reactor zones, where the mixed liquor is first subjected to an aerobic zone, followed by an anoxic zone and an aerobic zone. In another embodiment, the activated sludge tank 10 comprises two reactor zones, where the mixed liquor is first subjected to an anaerobic zone followed by an aerobic zone. In a further embodiment, the activated sludge tank 10 has four reactor zones, where the mixed liquor is first subjected to an anaerobic zone, followed by an anoxic zone and two aerobic zones. The listed embodiments serve as examples only. It should be understood that the activated sludge tank 10 may comprise one or more reactor zones arranged in any sequence. Furthermore, the activated sludge tank 10 may run as a batch process or a continuous process.

The activated sludge tank 10 may also have a long plug flow design where there are no discrete boundaries and the conditions change gradually over the length of the tank. In one embodiment, the tank environment gradually transitions from an anoxic environment at the upstream end to an aerobic environment at the downstream end. In an alternative embodiment, the tank environment gradually transitions from an aerobic environment at the upstream end, to an anoxic environment at the middle, and to an aerobic environment at the downstream end.

From the activated sludge tank 10, the mixed liquor is transferred by conduit 24 to the secondary separator 12 where solids are separated from the mixed liquor, leaving behind sludge and a clear effluent. In the embodiment shown in FIG. 1, the activated sludge tank 10 and the secondary separator 12 are separate units. In an alternative embodiment, the activated sludge tank 10 and the secondary separator 12 are combined into a sequencing batch reactor.

The secondary separator 12 may be any device that separates solids from liquids by, for example, gravity, differential settling velocity, or size-exclusion. Examples of secondary separators 12 include, but are not limited to, settling ponds, clarifiers, hydrocyclones, centrifuges, and membrane filters or separators. The clear effluent is removed along path 26 and may be disinfected and discharged into a local waterway. The remaining sludge, or activated sludge (AS) stream, comprising live bacteria, expired bacteria and other organic matter, is diverted to a sidestream by conduit 30.

The AS stream may be transferred to various locations in the wastewater treatment process. As shown in FIG. 1, the AS stream may be transported by conduit 32 to the interchange bioreactor 14 where a second bacteria population is cultivated under one or more growth conditions to decompose the sludge in the AS stream. A suitable interchange bioreactor 14 is described below and in U.S. Pat. No. 6,660,163 issued to Miklos, which is hereby fully incorporated by reference.

The bacteria population within the AS stream typically comprises one or more classes of bacteria. Such classes of bacteria include, but are not limited to, obligate aerobes, facultative aerobes, nitrifiers, obligate anaerobes, and facultative anaerobes. Each bacteria performs a certain function. For example, some bacteria convert particulate BOD into soluble BOD for utilization, some reduce high solids yield organisms, and some improve nitrification/denitrification efficiency. Each bacteria also thrives within a narrow range of conditions. Aerobic bacteria thrive in an oxygen environment, anaerobic bacteria thrive in an oxygen depleted environment, and facultative bacteria typically thrive in both environments. Bacteria within a population may be selectively activated by changing the growth conditions to which the population is subjected. Desired growth conditions may be achieved by effecting a selected order of aerobic, anoxic, and anaerobic conditions for varied lengths of time and repetitively controlling those conditions by measurement and reproduction of the oxidation-reduction potential (ORP), specific oxygen uptake rate (SOUR), specific nitrogen uptake rate (SNUR), pH, phosphorus, ammonia and/or nitrate content. Therefore, within the interchange bioreactor 14 it is possible to treat more than one component in the wastewater by selectively varying the conditions of the interchange bioreactor 14 to sequentially activate the individual types of bacteria.

The interchange bioreactor 14 may comprise one or more separate compartments, each of which maintains a controlled growth environment for cultivating one or more bacterial populations. The interchange bioreactor 14 may be operated in batch mode or continuous flow mode. Continuous flow mode encompasses processes having 1) continuous flow to the interchange bioreactor 14 and continuous flow out of the interchange bioreactor 14, 2) continuous flow to the interchange bioreactor 14 and batch flow out of the interchange bioreactor 14, or 3) batch flow to the interchange bioreactor 14 and continuous flow out of the interchange bioreactor 14. Although FIG. 1 shows a single interchange bioreactor 14 having one or more compartments, it should be understood by those skilled in the art that similar results may be obtained from multiple bioreactors connected in series, where each bioreactor may comprise one or more compartments.

In one embodiment, the interchange bioreactor 14 is run under anaerobic conditions to promote the growth and activity of anaerobic bacteria. Such bacteria may include obligate anaerobes and/or facultative anaerobes. Under anaerobic conditions, bacteria that accumulated quantities of phosphorus in excess of that required for simple cell growth and reproduction during aeration, now take up and store simple carbon compounds, using energy derived from the hydrolysis and release of phosphates. When the AS stream is eventually returned to the activated sludge tank 10, these bacteria are able to metabolize the absorbed carbon compounds in an aerobic zone.

In a second embodiment, the interchange bioreactor 14 is a sequencing facultative digester (SFD) favoring a low solids yield. Within an SFD, the AS stream comprising facultative bacteria is subjected to a sequence of anoxic and anaerobic conditions designed to break down the organic matter in the AS stream. The SFD can operate as a batch process, where the entire contents of the SFD are under anoxic conditions or anaerobic conditions. Alternatively, the SFD can operate as a continuous process where the SFD is divided into one or more separate compartments, each compartment operating under anoxic or anaerobic conditions. The sequence of conditions may take on any order.

After processing in the interchange bioreactor 14, the AS stream is either returned to the activated sludge tank 10 by conduit 34 or recycled back to the conditioning tank 16 by conduit 36. Alternatively, a portion of the AS stream is recycled back to the conditioning tank 16 and the remainder is returned to the activated sludge tank 10.

Instead of, or in addition to, sending the AS stream directly to the interchange bioreactor 14, the AS stream may be transferred to the conditioning tank 16 by conduit 38. The conditioning tank 16 improves the operation of the wastewater treatment process by providing a flexible mechanism for pre-treating the AS stream prior to processing in the interchange bioreactor 14 and/or returning the AS stream to the activated sludge tank 10. The conditioning tank 16 may be used to treat solids from highly loaded aeration basins, to thicken the AS stream prior to transport to the interchange bioreactor 14, and/or to optimize the biological or chemical reactions required for solids reduction.

Figure 2:
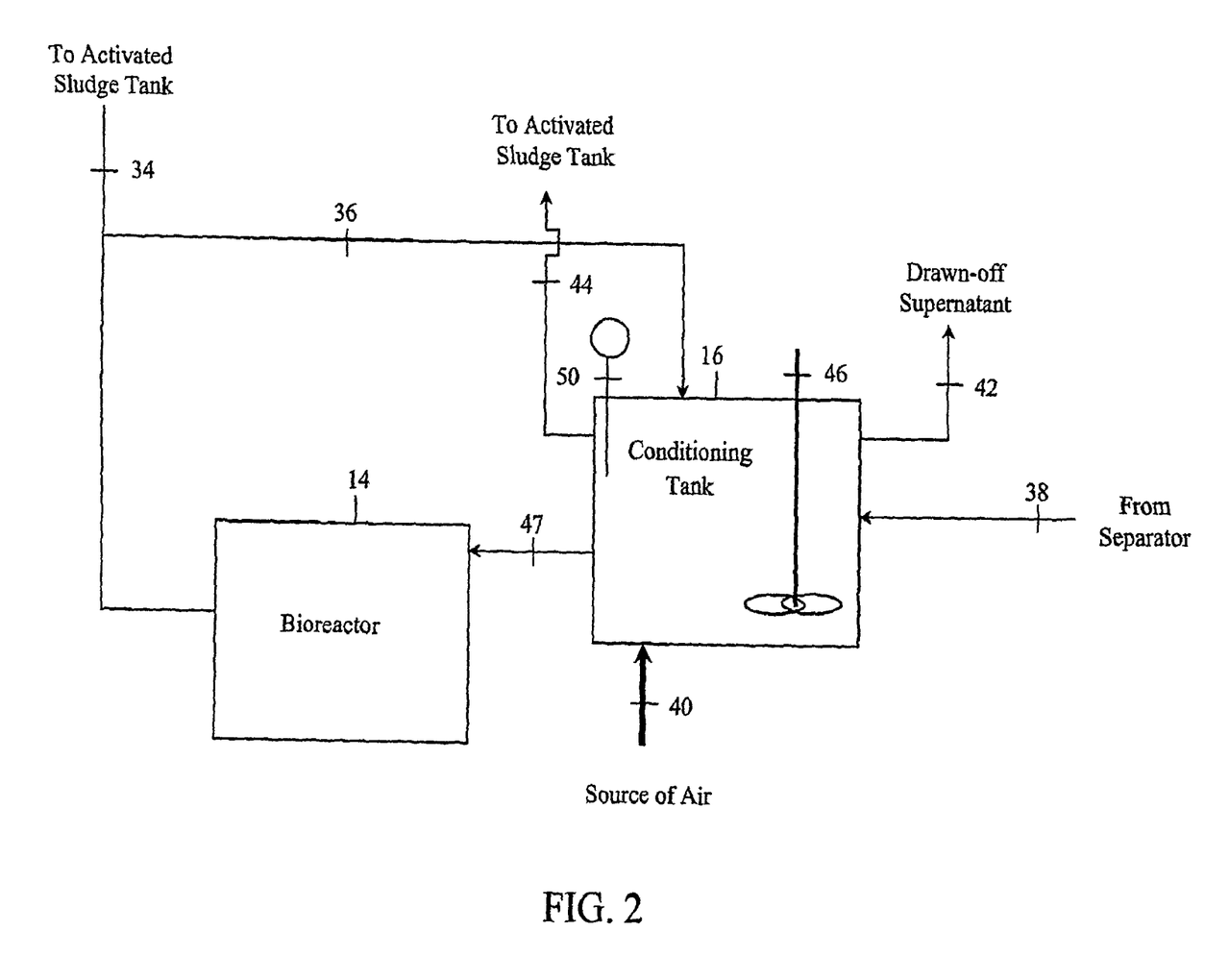
FIG. 2 is a schematic view of a conditioning tank and a bioreactor in the improved wastewater treatment system in FIG. 1.

The conditioning tank 16 is designed to meet a wide variety of processing conditions. In one embodiment, as shown in FIG. 2, the conditioning tank 16 includes provisions for adding air 40, provisions for drawing off supernatant 42, provisions for adding a return liquid/solids stream (i.e., AS stream) from the interchange bioreactor 36, provisions for flow through of the AS stream 44, provisions for mixing of the tank contents by conventional means 46, and provisions for measuring the ORP 50. The ability to control for any or all of these conditions offers the potential to greatly improve the performance of the wastewater treatment process for site specific wastewater requirements and for adjusting to diurnal, seasonal, or long-term variations that may occur at a wastewater treatment facility.

In one embodiment, the conditioning tank 16 allows a wastewater treatment plant to adjust to highly loaded aeration basins. Highly loaded aeration basins tend to produce an AS stream that is too reactive, or not stable enough, to be treated properly in the interchange bioreactor 14. Therefore, the AS stream is routed to the conditioning tank 16 for additional aeration and stabilization before being sent to the interchange bioreactor 14. Within the conditioning tank 16, the AS stream may be aerated for all, or a significant portion, of each day, depending upon the composition of the AS stream. Air may be introduced into the conditioning tank 16 by any conventional means of aeration known to those skilled in the art. The source of aeration may include, but is not limited to, pure oxygen, compressed air and mechanical aeration.

In an alternative embodiment, the conditioning tank 16 is used to re-aerate the AS stream from conduit 38, followed by interchanging a portion of the AS stream from the conditioning tank 16 to the interchange bioreactor 14 by conduit 47.

In another embodiment, the conditioning tank 16 is used as a gravity thickening tank to concentrate the solids in the AS stream prior to treatment in the interchange bioreactor 14. In some cases, the interchange bioreactor 14 may operate more effectively if the solids are concentrated prior to feeding into the interchange bioreactor 14. This method is particularly useful for a wastewater treatment plant where the influent loadings have increased to a point that the size of the interchange bioreactor 14 is marginal and additional detention time in the interchange bioreactor 14 could be realized through the treatment of an AS stream with a high solids concentration. Additionally, desirable chemistry and/or biochemistry occurring within the side stream interchange bioreactor 14 may be optimized by treating the AS stream with a higher solids concentration. In operation, the AS stream is routed to the conditioning tank 16 where the solids are allowed to settle and the supernatant is drawn off via conduit 42, thus concentrating the solids in the AS stream. The AS stream is then sent to the interchange bioreactor 14 for further processing.

In yet another embodiment, the AS stream is recirculated from the interchange bioreactor 14 to the conditioning tank 16 by conduit 36 to improve the performance of the wastewater treatment process.

The conditioning tank 16 is typically designed to adjust to the composition of the incoming waste stream. The above features may be applied individually or in combination. For example, the conditioning tank 16 may function as an aeration tank when the AS stream is highly loaded or function as a thickening tank when the influent loadings have increased to a certain level. Alternatively, the conditioning tank 16 may be used to simultaneously aerate and thicken the AS stream (e.g., air flotation). The conditioning tank 16 may operate as a continuous flow process or as a batch process. The detention time in the conditioning tank 16 is typically about 1 hour to about 5 days, depending on the desired performance and/or flexibility for a given installation. The contents of the conditioning tank 16 may or may not be mechanically mixed during operation.

After processing in the conditioning tank 16, the AS stream may be fed to the interchange bioreactor 14 by conduit 47 and/or returned to the activated sludge tank 10 by conduit 44.

Figure 3:
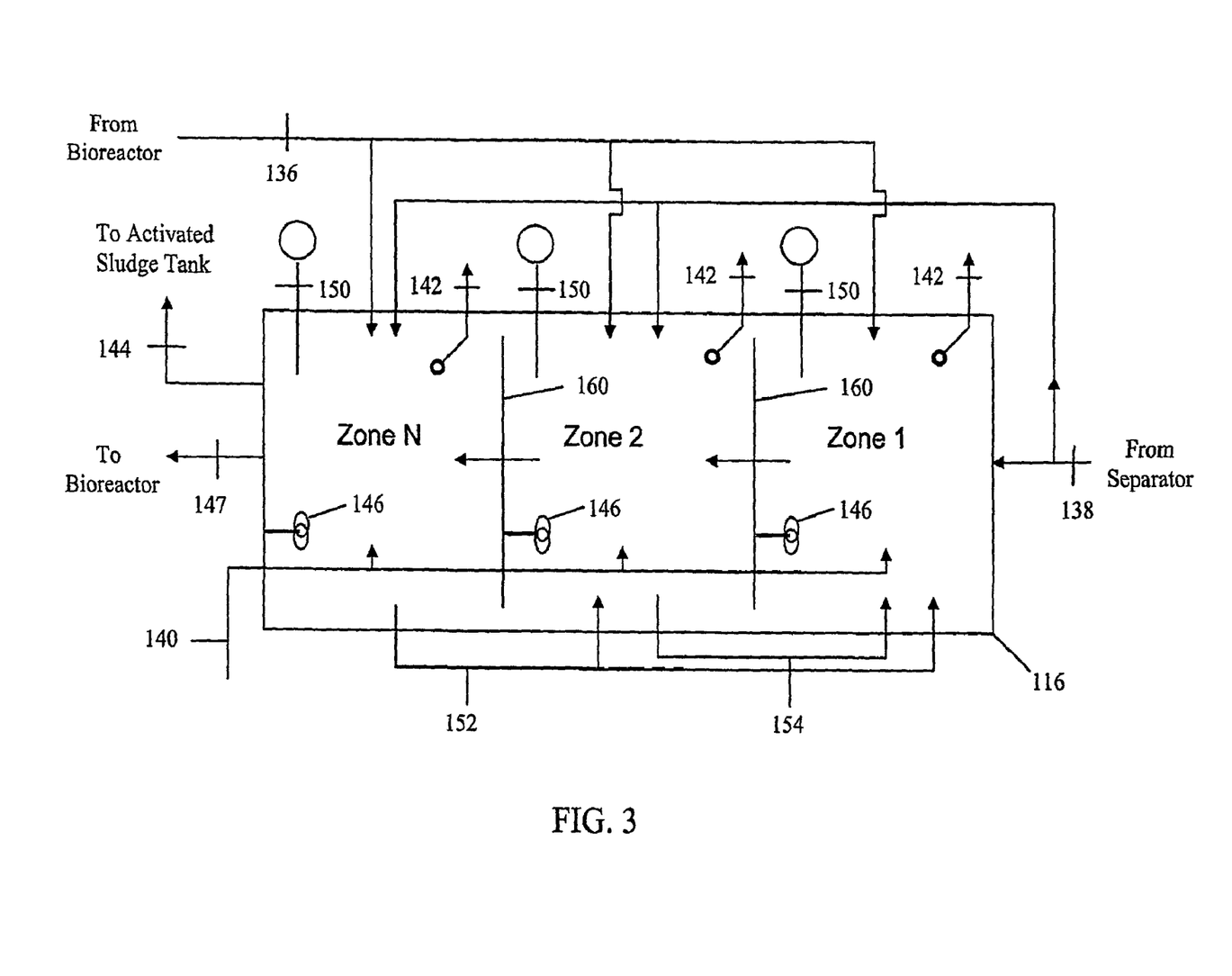
FIG. 3 is a schematic view of an alternative embodiment to the conditioning tank in FIG. 2.

In some instances it may be beneficial to compartmentalize the conditioning tank 16 or otherwise reconfigure the conditioning tank 16 to allow for plug flow to expose the AS to multiple environments as it passes through the conditioning tank 16. FIG. 3 illustrates an alternative conditioning tank 116 compartmentalized into multiple conditioning zones represented by Zone 1, Zone 2 and Zone N. The "N" in Zone N represents the number of additional zones beyond Zone 1 and Zone 2, where N may be any integer from zero to infinity. For example, when N is 0, the conditioning tank 116 comprises Zone 1 and Zone 2. When N is 2, the conditioning tank 116 comprises Zone 1, Zone 2 and two additional zones downstream of Zone 2. As N increases, the conditioning tank 116 approaches a plug flow process.

The conditioning tank 116 is compartmentalized into zones by partitions 160. The partitions 160 allow different conditioning environments to be created within each zone while also allowing wastewater to flow sequentially from Zone 1 to Zone N. Although only two such partitions 160 are illustrated in FIG. 3, the total number of partitions will be one less than the number of zones making up the conditioning tank 116. Therefore, a conditioning tank 116 with only two zones will have one partition, and a conditioning tank 116 with four zones will have three such partitions. The partitions 160 may comprise a baffle, a wall, a rigid board or a plank, a curtain or a drape, a tarp, a film, or a combination thereof. In addition, the partitions 160 may be constructed of a variety of materials including metal, wood, polymer, ceramic, composite, and combinations thereof. Although FIG. 3 shows multiple zones within a singe tank, it should be understood by those skilled in the art that similar results may be obtained by multiple tanks connected in series, where each tank comprises one or more zones.

Each zone may be designed with the same capabilities discussed above for the single compartment conditioning tank 16 illustrated in FIG. 2. For example, each zone may include provisions for receiving AS stream from the separator 138, provisions for adding air 140, provisions for adding a return liquid/solids stream (i.e., AS stream) from the interchange bioreactor 136, provisions for drawing off supernatant 142, provisions for mixing the zone contents by conventional means 146, provisions for measuring the ORP 150, and provisions for flow through of the AS stream 144. Additionally, provisions for internal recycle within the conditioning tank 116 may be provided by conduits 152 and 154.

As was the case in the single compartment conditioning tank 16, the multi-compartment conditioning tank 116 may be used to treat solids from highly loaded aeration basins, to thicken the AS stream prior to transport to the interchange bioreactor, and/or to optimize the biological or chemical reactions required for solids reduction. However, each zone within the multi-compartment conditioning tank 116 can function as an independent conditioning environment, allowing the operator to use one or all zones in a variety of combinations to effectively treat the wastewater.

In one exemplary process, the AS stream enters Zone 1 via conduit 138 and is sequentially treated in Zones B-N before being transferred to a bioreactor and/or the activated sludge tank in the main stream process. Desired growth conditions may be achieved within the conditioning tank 116 by effecting a selected order of aerobic, anoxic, and anaerobic conditions for varied lengths of time and controlling those conditions by monitoring the ORP 150. Other monitoring methods that may be used with, or in addition to, ORP 150 include SOUR, SNUR, pH, phosphorus, ammonia or nitrate content. The proper growth conditions may be maintained within each Zone 1-N by, for example, step feeding with AS stream from the clarifier via conduit 138, adding return liquid/solids stream from the interchange bioreactor 136, internally recycling AS within the conditioning tank 116 via conduits 152 and 154, and/or mixing with or without air supplied via conduit 140. The desired growth conditions will complement the waste stream in terms of content, strength, the biochemical and chemical environment used for treatment, and the specific effluent requirements. In some embodiments, desired growth conditions favor optimization of the microbial and biochemical reactions to improve solids reduction and minimization of WAS.

In an another exemplary process involving a two zone conditioning tank, Zone 1 is used to concentrate solids in the AS stream and Zone 2 is used to adjust a highly loaded aeration basin. In operation, AS stream enters Zone 1 via conduit 138 where the solids are allowed to settle and the supernatant is drawn off via conduit 142, thus concentrating the solids in the AS stream. The AS stream then flows into Zone 2 where it is aerated with mechanical stirring to reduce the BOD content. The treated AS stream is then sent to the interchange bioreactor via conduit 147 and/or returned to the activated sludge tank via conduit 144 for further treatment.

The above examples are non-limiting. In fact, the various zones with the conditioning tank 116 provide for considerable operational flexibility. For example, although provisions for transferring treated AS stream to the interchange bioreactor via conduit 147 and/or returning AS stream to the activated sludge tank via conduit 144 are illustrated with respect to Zone N, it should be understood that such provisions may be employed for each zone in the conditioning tank 116. In this way, an operator may choose to bypass one or more zones during treatment (e.g., use only the first two zones of a three zone conditioning tank), or send treated AS stream from more than one zone to the interchange bioreactor (e.g., send treated AS stream from both Zone 1 and Zone 2, as needed). The conditioning tank 116 may be run in batch mode or continuous flow mode. Continuous flow mode encompasses processes having 1) continuous flow to the conditioning tank 116 and continuous flow out of the conditioning tank 116, 2) continuous flow to the conditioning tank 116 and batch flow out of the conditioning tank 116, or 3) batch flow to the conditioning tank 116 and continuous flow out of the conditioning tank 116. Each zone may be configured for complete mix or plug flow operation with each zone having an independent aeration and mixing system. The detention time in each zone of the conditioning tank is typically about 1 hour to about 5 days, depending upon the desired performance and/or flexibility for a given installation.

Specific embodiments of the conditioning tank 16, 116 illustrated in FIGS. 1-3 may be implemented in different ways. For example, the mixer 46, 146 may be oriented vertically or horizontally, and supported and/or driven from the top, bottom or the side of the conditioning tank 16, 116 or a pump may be used for mixing internally transferring bulk liquid flows from one location to another within the conditioning tank 16, 116. The supply of air or oxygen 40, 140 may be introduced by different means, from above or below the liquid surface, and different input rates can be used.

Although the conditioning tank 16, 116 and interchange bioreactor 14 have been described separately, in some embodiments of the wastewater treatment process, the conditioning tank 16, 116 may serve as an extension of the interchange bioreactor 14. For example, the conditioning tank 16, 116 may be tailored to function with the interchange bioreactor 14 so as to comprise an off-line treatment area that may be used to control biological populations within the AS stream. As illustrated in FIG. 1, the off-line treatment area 70 is separate from the main stream process 72 comprising the activated sludge tank 10 and the secondary separator 12. The off-line treatment area 70 may be controlled to selectively stress the biological population developed in the main stream process 72 that does not have the desired characteristics of low growth or low yield bacteria. The resulting modified population may be added back to the activated sludge tank 10 to optimize further treatment of the waste stream by performing such tasks as improving nitrification/denitrification efficiency, or achieving target levels of desirable biological make-up, such as, for example, increasing the population of facultative anaerobic bacteria while minimizing sludge yield.

The biological populations generated in the off-line treatment area 70 may favor low solids-yield microorganisms, high removal-efficiency microorganisms, provide high or low-load return material for the main treatment process 72, minimize the formation of filamentous biology, and/or provide for the consumption of residual sludge (to minimize its volume). The biological populations may also be used to provide enhanced quantities of desirable nutrients, additional oxygenation capacity, increased conversion of particulate carbon to solubilized cBOD, and reductions in disposal volume for certain nutrients.

As noted above, one way to quantify the operating characteristics of a water or wastewater treatment facility is by oxidation reduction potential (ORP), the techniques of which are familiar to those skilled in the art. As shown in Table 1, growth of filamentous *Norcardia* sp. is especially favored in an ORP range of about −50 to +50 mV which range is also typified by low dissolved oxygen content (microaerobic) concurrent with low amounts of soluble cBOD. These preferred conditions for growth and replication of *Norcardia* sp. result in their enhanced population which gives unfavorable settling and higher yield characteristics to the overall biological population and suspended solids of the main treatment process. Hence, waste treatment plant operation is hindered by maintaining conditions in this microaerophilic range that may be necessitated by high plant throughput rates.

TABLE 1

| Region | ORP Range (mV) | Example Biology |
|---|---|---|
| Obligate anaerobic | <−400 | Methanogens |
| Facultative anaerobic | −400 to −200 | Sulfate reducing bacteria, Acidogens |
| Facultative aerobic | −200 to +500 | *Bacillus* spp., *Pseudomonas* spp, |
| Microaerophilic | −50 to +50 | *Norcardia* sp., Type 1701, *Sphaerotilus natans* |
| Obligate aerobic | +50 to +200 | *Nitrosomonas* and *Nitrobacter* |
| Condition | | |
| Aerobic | >+50 | |
| Anoxic | −150 to +50 | |
| Anaerobic | <−150 | |

These and other factors may be mitigated by the present invention. For example, the AS stream may be customized by controlling factors such as solids content, residence time, mixing with air, mixing without air, subsequent addition of influent or sludge, and/or the selective removal of certain fractions of the mixture to achieve certain biological results including the demise of certain biological populations, the enhancement of other, preferred, populations and the modification of the profile in surviving populations different than what is generated during the main stream process.

Customized biological populations may be generated to achieve specific objectives. In one process, as represented by FIG. 1 for example, wastewater is transferred to an activated sludge tank 10 where it is combined with a first biological population having a first-biological population profile to produce a mixed liquor comprising AS. The AS is separated from the mixed liquor to produce an AS stream. A portion of the AS stream is returned to the activated sludge tank 10. A second portion of the AS stream is sent to an off-line treatment area 70 to produce a second biological population having a second-biological population profile different from the first-biological population profile. At least a fraction of the second biological population is returned to the activate sludge tank 10.

In one embodiment, the second biological population is created by mixing the second portion of the AS stream without aeration to achieve anaerobic conditions without substantial sulfide generate as determined by measuring ORP; mixing with aeration to achieve biological growth conditions without substantial production of obligate aerobes; and mixing without aeration to achieve anaerobic conditions.

In another embodiment, the second biological population is created by mixing the second portion of the AS stream without aeration to achieve anaerobic conditions without substantial sulfide generation as determined by measuring ORP; mixing with aeration to achieve biological growth conditions without substantial production of obligate aerobes; mixing without aeration to achieve anaerobic conditions; allowing settling to produce a decantable volume; and mixing with aeration to achieve biological growth conditions without substantial production of obligate aerobes.

In a further embodiments, the second biological population is created by mixing the second portion of the AS stream without aeration to achieve anaerobic conditions without substantial sulfide generation as determined by measuring ORP; stopping the mixing for a period of time; mixing; and mixing with aeration to achieve biological growth conditions without substantial production of obligate aerobes.

In yet a further embodiment, the second biological population is created by mixing the second portion of the AS stream without aeration to achieve anaerobic conditions without substantial sulfide generation as determined by measuring ORP; mixing with aeration to achieve biological growth conditions without substantial production of obligate aerobes; and stopping the aeration but continuing the mixing.

In another embodiment, the second biological population is created by mixing the second portion of the AS stream without aeration to achieve anaerobic conditions without substantial sulfide generation as determined by measuring ORP; mixing with aeration to achieve biological growth conditions without substantial production of obligate aerobes; stopping the aeration but continuing the mixing; allowing settling; and mixing with aeration to achieve biological growth conditions without substantial production of obligate aerobes.

In the above examples, the environments within the conditioning tank 16 and interchange bioreactor 14 together create the second biological population in the off-line treatment area 70. At least a portion of the second biological population in then recycled to the activated sludge tank 10 to optimize further treatment of the waste stream. Together the conditioning tank 16 and interchange bioreactor 14 may operate as a continuous process, a batch process or a combination thereof. Although the above process has been described with respect to FIG. 1 and conditioning tank 16, it should be understood that multi-compartment conditioning tanks, such as conditioning tank 116 in FIG. 3, may be used as well.

Referring back to FIG. 1, instead of, or in addition to, sending AS directly to the interchange bioreactor 14 and the conditioning tank 16, the AS stream from the secondary separator 12 may be returned to the activated sludge tank 10 by conduit 49.

Although each of the AS stream pathways in FIG. 1 has been described individually, it should be recognized that the AS stream may be entirely diverted along one of the pathways or alternatively split among two or more pathways. Additionally, the selected pathways and the amount of the AS stream sent to each pathway may be adjusted as needed to most efficiently and effectively treat the wastewater entering the treatment plant at any given time.

Figure 4:
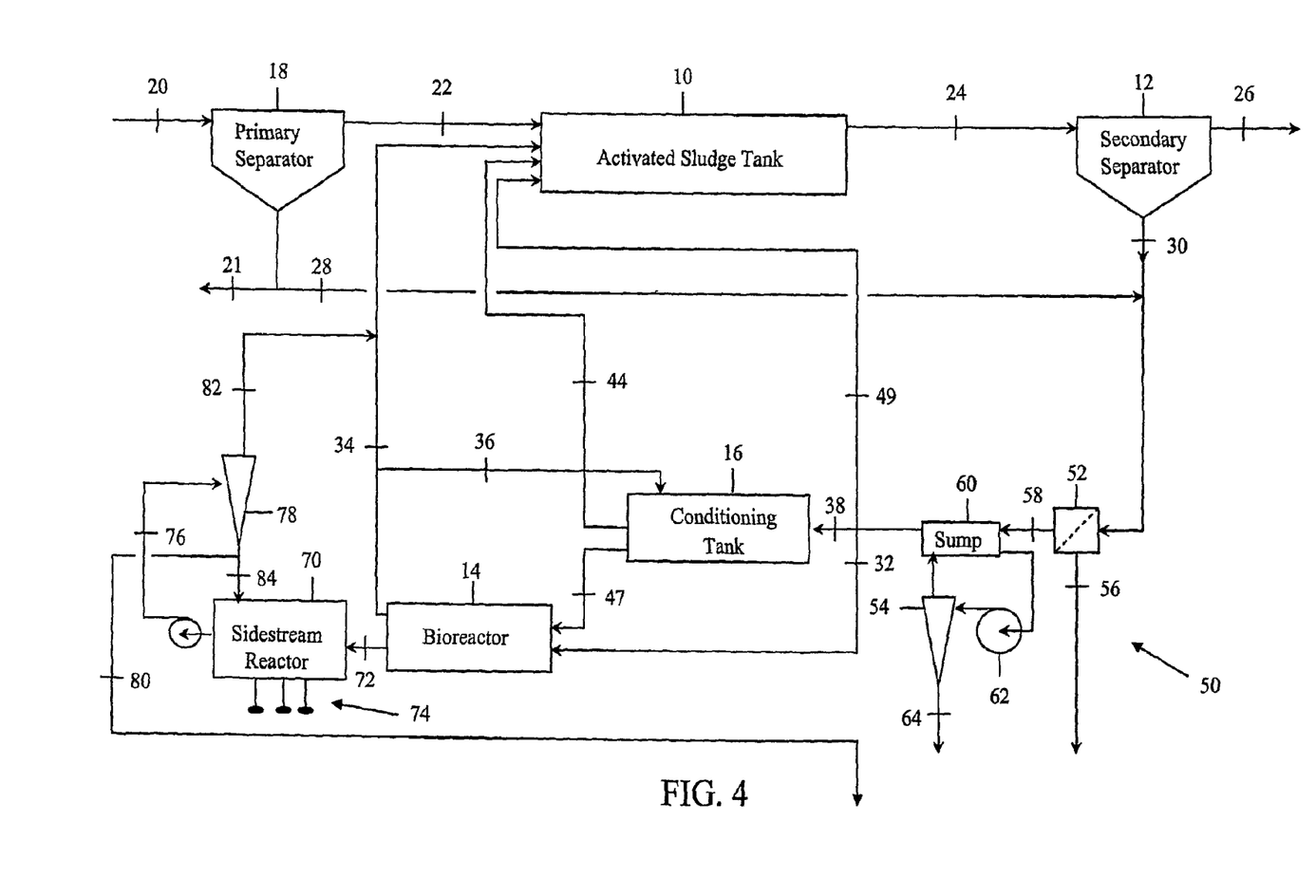
FIG. 4 is a schematic view of an alternative embodiment of the improved wastewater treatment system in FIG. 1.

In an alternative embodiment of the invention, as shown in FIG. 4, the AS stream may optionally pass through a solids separation module 50. Wastewater typically comprises a variety of solids, including small organic materials such as microorganisms critical to wastewater treatment, larger organic matter such as trash, and small and large inorganic particles such as sand. Removal of trash and inorganic solids from the wastewater substantially increases the efficiency of the wastewater treatment process. Therefore, it is often beneficial to include a solids separation module 50 in the treatment process. A suitable solids separation module 50 is described below and in U.S. Pat. Nos. 5,658,458, 5,626,755 and 5,824,222 issued to Keyser et al., which are hereby fully incorporated by reference.

A suitable solids separation module 50 includes one or more screens 52, in series or parallel, having a suitable opening size to remove large organic and inorganic particles, and one or more mechanical separators 54, in series or parallel, for removing small inorganic particles similar in size to the microorganisms. Examples of screens 52 include, but are not limited to, drum screens and flat screens. Examples of mechanical separators 54 include, but are not limited to, a gravity separator, a hydrocyclone and a centrifuge. The screens 52 and mechanical separators 54 may be employed in any order.

In one embodiment, as illustrated in the embodiment of FIG. 4, the AS stream flows through a screen 52 in the solids separation module 50. The screen 52 blocks passage of large inorganic and organic matter which is later removed as solid waste along path 56. The AS stream is then fed by conduit 58 to a sump 60. A pump 62 transfers the AS stream from the sump 60 to the mechanical separator 54. Small, inert solids are separated from the AS stream and removed from the solids separation module 50 along path 64 as solid waste. The remainder of the AS stream is returned to the sump 60 where it can be transported by conduit 49 to the activated sludge tank 10, sent by conduit 38 to the conditioning tank 16, transferred to the interchange bioreactor 14 and/or pumped back through the mechanical separator 54. In some embodiments, such as the illustrated embodiment in FIG. 3, the solids separation module 50 is located between the secondary separator 12 and the interchange bioreactor 14. However, the solids separation module 50 may be located elsewhere, such as downstream of the activated sludge tank 10 and upstream of the secondary separator 12.

The wastewater treatment system may also optionally include a process for removing phosphates from the wastewater. In a low WAS treatment system, phosphates typically remain in the wastewater stream and are removed from the plant along with the clear effluent. If the phosphates are in high enough concentration, the clear effluent must be treated to remove the phosphates prior to discharging the effluent into a local waterway. Any process capable of removing phosphates from the wastewater may be employed.

In one embodiment, as shown in FIG. 4, at least a portion of the AS stream may be transported by conduit 72 to a sidestream reactor 70 where soluble phosphates are removed from the sludge stream as solid phosphates. Within the sidestream reactor 70, an acid or base is typically added to adjust the pH of the AS stream to slightly alkaline, and a source of multivalent metal ions is added to precipitate the phosphates. Any multivalent metal ion that forms an insoluble phosphate having a specific gravity greater than the organic matter making up the sludge may be used. Preferably, the multivalent metal ions comprise calcium and/or magnesium. Additionally, other reagents, such as ammonia, may be added as needed to form the desired precipitate. In some embodiments, such as the illustrated embodiment of FIG. 3, reagents are fed into the sidestream reactor 70 through a series of conduits 74. For example, one conduit 74 may supply a base to adjust the pH of the sludge stream. Another conduit 74 may supply a multivalent metal ion used to precipitate the phosphate. Yet another may supply a source of ammonia or raw wastewater. A mechanical mixer (not shown) can be used to insure adequate mixing of all materials. The sidestream reactor 70 may operate as a continuous, semi-continuous or batch process, and may be employed continuously or periodically. In the case of periodic use, the level of soluble phosphates in the sludge stream is allowed to build up over a period of time before the sludge stream is diverted to the sidestream reactor 70 for treatment.

In one preferred embodiment, soluble phosphates are precipitated in the sidestream reactor 70 as struvite, $MgNH_4PO_4 \cdot 6H_2O$. Favorable reaction conditions require a slightly alkaline sludge stream and an adequate source of magnesium ions and ammonium ions. Since the pH of the sludge stream is usually neutral when it leaves the interchange bioreactor 14, a standard base such as, but not limited to, NaOH, KOH, NH$_4$OH and Mg(OH)$_2$ may be added. Typically, the pH of the sludge stream in the sidestream reactor 70 is adjusted to about 8 to about 10. More preferably the pH is adjusted to about 8.5 to about 9.5. In addition to adjusting the pH, a source of magnesium ion must be present in the sludge stream. The amount of magnesium ion required is about 100% to about 120% the stoichiometric amount. More preferably the amount of magnesium ion is about 110% the stoichiometric amount. If a sufficient source of magnesium ion exists in solution, no further source need be added. Otherwise, a source of magnesium ion such as, but not limited to, MgCl$_2$, MgHCO$_3$, MgO, MgSO$_4$, and Mg(OH)$_2$ may be added. Finally, a source of ammonium ion is required. Many sludge streams by nature have a high ammonia content that can provide an adequate source of ammonium ions. However, if necessary, raw wastewater or other sources of ammonia such as, but not limited to, NH$_4$OH and NH$_4$Cl may be added to the sidestream reactor 70 to provide a sufficient concentration of ammonium ions. The amount of ammonium in the sludge stream is preferably about 100% to about 120% the stoichiometric amount. The contents of the sidestream reactor 70 are mechanically mixed for about 20 minutes to about 2 hours. Soluble phosphates precipitate out of the sludge stream as struvite, MgNH$_4$PO$_4$.6H$_2$O.

In a second preferred embodiment, soluble phosphates are precipitated in the sidestream reactor 70 as calcium phosphate, Ca$_3$(PO$_4$)$_2$. Favorable reaction conditions require a slightly alkaline sludge stream and an adequate source of calcium ions. Since the pH of the sludge stream is usually neutral when it leaves the interchange bioreactor 14, a standard base such as, but not limited to, NaOH, KOH, NH$_4$OH and Mg(OH)$_2$ may be added. Typically, the pH of the sludge stream in the sidestream reactor 70 is adjusted to about 8 to about 10. More preferably the pH is adjusted to about 8.5 to about 9.5. In addition to adjusting the pH, a source of calcium ions must be present in the sludge stream. The amount of calcium ions required is about 100% to about 120% the stoichiometric amount. More preferably the amount of calcium ions is about 110% the stoichiometric amount. If a sufficient source of calcium ions exists in solution, no further source need be added. Otherwise, a source of calcium ions including, but not limited to, CaCl$_2$ and Ca(OH)$_2$ may be added. The contents of the sidestream reactor 70 are mechanically mixed for about 20 minutes to about 2 hours. Soluble phosphates precipitate out of the sludge stream as calcium phosphate, Ca$_3$(PO$_4$)$_2$.

The contents of the sidestream reactor 70 are then pumped by conduit 76 to one or more separators 78 to remove the solid phosphates from the AS stream. The solid phosphates can be separated from the AS stream based on differential settling velocity using any number of mechanical means including, but not limited to, a gravity separator, a hydrocyclone and a centrifuge. The solid phosphates may be discharged along path 80 as a concentrated sludge stream relatively low in biological solids. The remainder of the AS stream may be recycled back to the activated sludge tank 10 by conduit 82 for further treatment. Alternatively, a portion of the AS stream can be returned to the sidestream reactor 70 by conduit 84 to facilitate the formation of larger crystals by having the crystals formed earlier acting as seeds for the formation of larger crystals.

Figure 5:
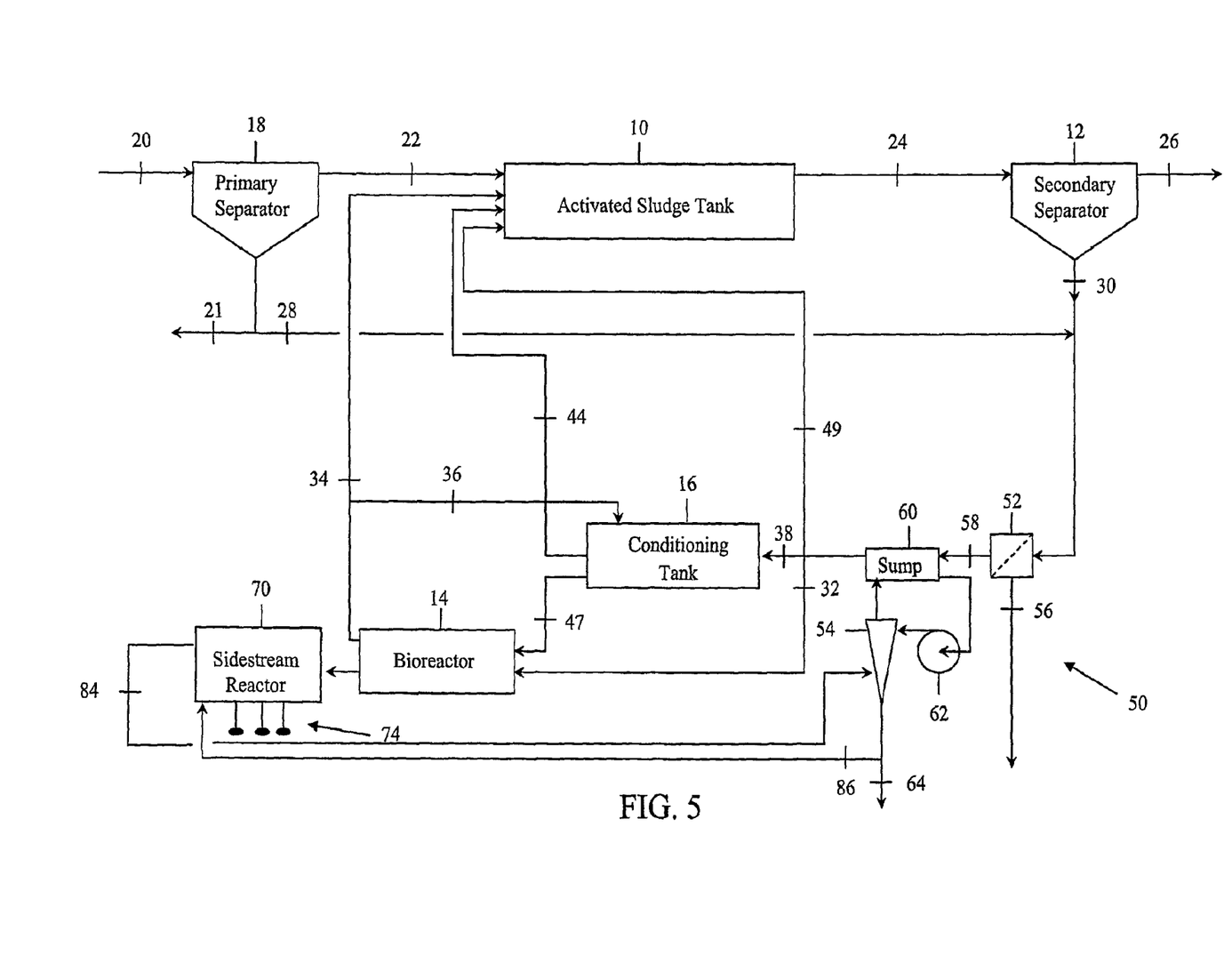
FIG. 5 is a schematic view of an alternative embodiment of the improved wastewater treatment system in FIG. 4.

In an alternative embodiment of the invention, such as in the illustrated embodiment of FIG. 5, the mechanical separator 54 used to remove small inorganic particles from the AS stream may also be used to separate the solid phosphates from the AS stream. The AS stream from the sidestream reactor 70 is sent by conduit 84 to the mechanical separator 54 contained within the solids separation module 50. The solid phosphates are separated from the AS stream and disposed as solid waste along path 64 and/or returned to the sidestream reactor 70 by conduit 86 to provide seed crystals. The AS stream is returned to the activated sludge tank 10 by conduit 49, transported to the conditioning tank 16 by conduit 38, transported to the interchange bioreactor 14 by conduit 32, and/or recycled back through the mechanical separator 54.

We claim:

1. A method for treating wastewater comprising:
combining wastewater with bacteria-laden sludge in an activated sludge tank to form a mixed liquor;
separating the mixed liquor into a clear effluent and activated sludge stream;
processing at least a portion of the activated sludge stream in an interchange bioreactor by selecting desired growth conditions to cultivate at least one type of bacteria, wherein the interchange bioreactor comprises at least two compartments; and
returning at least a portion of the activated sludge stream in the bioreactor to the activated sludge tank.

2. The method of claim 1, wherein the interchange bioreactor operates in continuous flow mode.

3. The method of claim 1, wherein the interchange bioreactor is a sequencing facultative digester.

4. The method of claim 3, wherein the sequencing facultative digester operates in continuous flow mode.

5. The method of claim 1, wherein at least a portion of any solids present in the wastewater are removed from the wastewater prior to treatment in the activated sludge tank.

6. The method of claim 1, wherein at least a portion of the mixed liquor within the activated sludge tank is subjected to an aerobic environment.

7. The method of claim 1, wherein at least a portion of the mixed liquor within the activated sludge tank is subjected to an anaerobic environment followed by at least one of an anoxic environment and an aerobic environment.

8. The method of claim 1, further comprising pretreating at least a portion of the activated sludge stream in a conditioning tank comprising one or more conditioning zones, and transferring at least a portion of the pretreated activated sludge stream in the conditioning tank to the interchange bioreactor.

9. The method of claim 8, wherein pretreating the activated sludge stream comprises aerating the activated sludge stream in the conditioning tank.

10. The method of claim 8, wherein pretreating the activated sludge stream comprises returning activated sludge stream from the interchange bioreactor to the conditioning tank.

11. The method of claim 8, wherein pretreating the activated sludge stream comprises concentrating the activated sludge stream in the conditioning tank.

12. The method of claim 8, wherein the conditioning tank comprises two or more conditioning zones.

13. The method of claim 12, wherein pretreating the activated sludge stream comprises internally recycling the activated sludge stream within the conditioning tank.

14. The method of claim 11, wherein concentrating the activated sludge stream comprises sufficiently settling the sludge stream to form a supernatant and drawing off the supernatant from the conditioning tank.

15. The method of claim 8, wherein pretreating the activated sludge stream enhances solid reduction in the wastewater treatment process.

16. The method of claim 8, wherein pretreating the activated sludge stream comprises detaining the activated sludge stream in each conditioning zone for about 1 hour to about 5 days.

17. The method of claim 8, wherein the conditioning tank operates as a batch process or a continuous process.

18. The method of claim 1, further comprising passing the activated sludge stream through a solids separation module upstream of the interchange bioreactor to remove at least a portion of trash and inorganic solids from the activated sludge stream.

19. The method of claim 8, wherein at least a portion of the activated sludge stream in the conditioning tank is directly returned to the activated sludge tank.

20. The method of claim 1, wherein at least a portion of the activated sludge stream separated from the mixed liquor is directly returned to the activated sludge tank.

21. A method for treating wastewater comprising:
   combining wastewater with bacteria-laden sludge in an activated sludge tank to form a mixed liquor;
   separating the mixed liquor into a clear effluent and activated sludge stream;
   pretreating at least a portion of the activated sludge stream in a conditioning tank comprising at least two conditioning zones;
   transferring at least a portion of the pretreated activated sludge stream in the conditioning tank to an interchange bioreactor;
   processing the pretreated activated sludge stream within the interchange bioreactor by selecting desired growth conditions to cultivate at least one type of bacteria in the pretreated activated sludge; and
   returning at least a portion of the activated sludge stream in the interchange bioreactor to the activated sludge tank.

22. The method of claim 21, wherein the interchange bioreactor operates in batch mode or continuous flow mode.

23. The method of claim 21, wherein the interchange bioreactor is a sequencing facultative digester.

24. The method of claim 23, wherein the sequencing facultative digester operates in continuous flow mode.

25. The method of claim 21, wherein at least a portion of any solids present in the wastewater are removed from the wastewater prior to treatment in the activated sludge tank.

26. The method of claim 21, wherein at least a portion of the mixed liquor within the activated sludge tank is subjected to an aerobic environment.

27. The method of claim 21, wherein at least a portion of the mixed liquor within the activated sludge tank is subjected to an anaerobic environment followed by at least one of an anoxic environment and an aerobic environment.

28. The method of claim 21, wherein pretreating the activated sludge stream comprises aerating the activated sludge stream in the conditioning tank.

29. The method of claim 21, wherein pretreating the activated sludge stream comprises returning activated sludge stream from the interchange bioreactor to the conditioning tank.

30. The method of claim 21, wherein pretreating the activated sludge stream comprises concentrating the activated sludge stream in the conditioning tank.

31. The method of claim 21, wherein pretreating the activated sludge stream comprises internally recycling the activated sludge within the conditioning tank.

32. The method of claim 30, wherein concentrating the activated sludge stream comprises sufficiently settling the sludge stream to form a supernatant and drawing off the supernatant from the conditioning tank.

33. The method of claim 21, wherein pretreating the activated sludge stream enhances solid reduction in the wastewater treatment process.

34. The method of claim 21, wherein pretreating the activated sludge stream comprises detaining the activated sludge stream in each conditioning zone for about 1 hour to about 5 days.

35. The method of claim 21, wherein the conditioning tank operates as a batch process or a continuous process.

36. The method of claim 21, further comprising passing the activated sludge stream through a solids separation module upstream of the interchange bioreactor to remove at least a portion of trash and inorganic solids from the activated sludge stream.

37. The method of claim 21, wherein at least a portion of the activated sludge stream in the conditioning tank is directly returned to the activated sludge tank.

38. The method of claim 1, wherein at least a portion of the activated sludge stream separated from the mixed liquor is directly returned to the activated sludge tank.

39. A method of treating wastewater, the method comprising the steps of:
   conducting wastewater to an activated sludge tank for treatment comprising contact with a first biological population having a first-biological population profile to produce a mixed liquor including activated sludge;
   separating the activated sludge from the mixed liquor to produce an activated sludge stream;
   drawing off a first portion of the separated activated sludge stream and returning said first portion to the activated sludge tank;
   drawing off a second portion of the separated activated sludge stream and adding that second portion to at least one off-line treatment area operating in continuous flow mode;
   controlling the off-line treatment area so as to produce, in the off-line treatment area, a second biological population having a second-biological population profile different from the first-biological population profile; and
   returning at least a fraction of the produced second biological population to the activated sludge tank, wherein the second biological population achieves lower solids levels.

40. The method of claim 39 wherein the step of returning at least a fraction of the produced second biological population includes removing a percentage of the produced second biological population from the off-line treatment area.

41. The method of claim 39 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes; and
   iv. mixing without aeration to achieve anaerobic conditions.

42. The method of claim 39 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes;
   iii. mixing without aeration to achieve anaerobic conditions;

iv. allowing settling to produce a decantable volume; and
v. mixing with aeration to achieve biological growth conditions without substantial production of obligate aerobes.

43. The method of claim 39 wherein controlling the off-line treatment area comprises:
   i. mixing the second drawn-off portion without aeration to achieve anaerobic conditions without substantial sulfide generation;
   ii. stopping the mixing for a period of time;
   iii. mixing; and
   iv. mixing with aeration to achieve biological growth conditions without substantial production of obligate aerobes.

44. The method of claim 39 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes; and
   iii. stopping the aeration but continuing the mixing.

45. The method of claim 39 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes;
   iii. stopping the aeration but continuing the mixing;
   iv. allowing settling; and
   v. mixing with aeration to achieve biological growth conditions without substantial production of obligate aerobes.

46. A method for treating wastewater in a wastewater treatment system including an activated sludge tank for receiving wastewater and for treatment including contact with a first biological population having a first-biological population profile, the method comprising the steps of:
   drawing off a portion of the first biological population and adding said drawn-off portion to an off-line treatment area operating in continuous flow mode;
   controlling the off-line treatment area to produce a second biological population having a second-biological population profile different from the first-biological population profile, such controlling including sequentially subjecting the off-line treatment area portion to one of aerobic conditions, anoxic conditions and anaerobic conditions followed by subjecting the off-line treatment area portion to at least one of aerobic conditions, anoxic conditions and anaerobic conditions; and
   returning at least a portion of the second biological population to the activated sludge tank.

47. The method of claim 46 wherein the step of returning at least a fraction of the produced second biological population includes removing a percentage of the produced second biological population from the off-line treatment area.

48. The method of claim 46 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes; and
   iv. mixing without aeration to achieve anaerobic conditions.

49. The method of claim 46 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes;
   iii. mixing without aeration to achieve anaerobic conditions;
   iv. allowing settling to produce a decantable volume; and
   v. mixing with aeration to achieve biological growth conditions without substantial production of obligate aerobes.

50. The method of claim 46 wherein controlling the off-line treatment area comprises:
   i. mixing the second drawn-off portion without aeration to achieve anaerobic conditions without substantial sulfide generation;
   ii. stopping the mixing for a period of time;
   iii. mixing; and
   iv. mixing with aeration to achieve biological growth conditions without substantial production of obligate aerobes.

51. The method of claim 46 wherein controlling the off-line treatment area comprises:
   i. mixing the second drawn-off portion of wastewater without aeration to achieve anaerobic conditions without substantial sulfide generation;
   ii. mixing with aeration to achieve biological growth conditions without substantial production of obligate aerobes; and
   iii. stopping the aeration but continuing the mixing.

52. The method of claim 46 wherein controlling the off-line treatment area comprises:
   i. mixing the second drawn-off portion of wastewater without aeration to achieve anaerobic conditions without substantial sulfide generation;
   ii. mixing with aeration to achieve biological growth conditions without substantial production of obligate aerobes;
   iii. stopping the aeration but continuing the mixing;
   iv. allowing settling; and
   v. mixing with aeration to achieve biological growth conditions without substantial production of obligate aerobes.

53. A method of treating wastewater, the method comprising the steps of:
   combining wastewater and a first biological population having a first-biological population profile in an activated sludge tank;
   exposing the wastewater and first biological population in the activated sludge tank to at least one of an anaerobic, anoxic and aerobic conditions to form a mixture including sludge;
   separating the sludge from the mixture;
   drawing off a first portion of the separated sludge and returning said first portion to the activated sludge tank;
   drawing off a second portion of the separated sludge to an off-line treatment area operating in continuous flow mode;
   controlling the off-line treatment area so as to produce, in the off-line treatment area, a second biological population having a second-biological population profile different from the first-biological population profile, such that the second-biological population profile is customized to minimize the disposal volume of residual solids produced by the treatment of the wastewater; and returning at least a fraction of the produced second biological population to the treatment area.

54. The method of claim 53 wherein the step of returning at least a fraction of the produced second biological population includes removing a percentage of the produced second biological population from the off-line treatment area.

55. The method of claim 53 wherein raw influent is combined with the second portion of separated sludge in the off-line treatment area.

56. The method of claim 53 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes; and
   iv. mixing without aeration to achieve anaerobic conditions.

57. The method of claim 53 wherein controlling the off-line treatment area comprises:
   i. mixing the second drawn-off portion without aeration to achieve anaerobic conditions without substantial sulfide generation;
   ii. mixing with aeration to achieve biological growth conditions without substantial production of obligate aerobes;
   iii. mixing without aeration to achieve anaerobic conditions;
   iv. allowing settling to produce a decantable volume; and
   v. mixing with aeration to achieve biological growth conditions without substantial production of obligate aerobes.

58. The method of claim 53 wherein controlling the off-line treatment area comprises:
   i. mixing the second drawn-off portion without aeration to achieve anaerobic conditions without substantial sulfide generation;
   ii. stopping the mixing for a period of time;
   iii. mixing; and
   iv. mixing with aeration to achieve biological growth conditions without substantial production of obligate aerobes.

59. The method of claim 53 wherein controlling the off-line treatment area comprises:
   i. mixing the second drawn-off portion of wastewater without aeration to achieve anaerobic conditions without substantial sulfide generation;
   ii. mixing with aeration to achieve biological growth conditions without substantial production of obligate aerobes; and
   iii. stopping the aeration but continuing the mixing.

60. The method of claim 53 wherein controlling the off-line treatment area comprises:
   i. mixing the second drawn-off portion of wastewater without aeration to achieve anaerobic conditions without substantial sulfide generation;
   ii. mixing with aeration to achieve biological growth conditions without substantial production of obligate aerobes;
   iii. stopping the aeration but continuing the mixing;
   iv. allowing settling; and
   v. mixing with aeration to achieve biological growth conditions without substantial production of obligate aerobes.

* * * * *